United States Patent
Liu et al.

(10) Patent No.: US 10,567,088 B2
(45) Date of Patent: Feb. 18, 2020

(54) OPTICAL NOISE REMOVAL CIRCUIT, OPTICAL RECEIVER, AND OPTICAL CHIP

(71) Applicant: KUANG-CHI INTELLIGENT PHOTONIC TECHNOLOGY LTD., Shenzhen (CN)

(72) Inventors: Ruopeng Liu, Shenzhen (CN); Weicheng Xu, Shenzhen (CN); Linyong Fan, Shenzhen (CN); Guangjin Xiao, Shenzhen (CN)

(73) Assignee: KUANG-CHI INTELLIGENT PHOTONIC TECHNOLOGY LTD., Shenzhen (CN)

( * ) Notice: Subject to any disclaimer, the term of this patent is extended or adjusted under 35 U.S.C. 154(b) by 0 days.

(21) Appl. No.: 16/122,884

(22) Filed: Sep. 6, 2018

(65) Prior Publication Data

US 2018/0367221 A1   Dec. 20, 2018

Related U.S. Application Data

(63) Continuation of application No. PCT/CN2017/075622, filed on Mar. 3, 2017.

(51) Int. Cl.
*H04B 10/06* (2006.01)
*H04B 10/69* (2013.01)
(Continued)

(52) U.S. Cl.
CPC ....... *H04B 10/6972* (2013.01); *H04B 10/116* (2013.01); *H04B 10/60* (2013.01)

(58) Field of Classification Search
CPC .......................... H04B 10/6972; H04B 10/116
See application file for complete search history.

(56) References Cited

U.S. PATENT DOCUMENTS 5,495,358 A * 2/1996 Bartig ................. H03F 3/08
398/135
6,366,373 B1 * 4/2002 MacKinnon ....... H04B 10/0773
398/185
(Continued)

FOREIGN PATENT DOCUMENTS

CN    101232329 A    7/2008
CN    101620664 A    1/2010
(Continued)

*Primary Examiner* — David C Payne
*Assistant Examiner* — Pranesh K Barua
(74) *Attorney, Agent, or Firm* — Armstrong Teasdale LLP

(57) ABSTRACT

The present invention relates to an optical noise removal circuit, an optical receiver, and an optical chip. The optical noise removal circuit includes: a noise filter unit, where an input end of the noise filter unit receives an electrical signal coming from an photoelectric conversion unit, and the noise filter unit is configured to filter out a noise electrical signal, in the electrical signal, that is generated due to ambient light, and output a target pulse signal at an output end; and a comparison unit, where a first input end of the comparison unit is coupled to the output end of the noise filter unit to receive the target pulse signal, and the comparison unit is configured to output a digital signal based on comparison between the target pulse signal and a reference voltage. By implementing the present invention, quality of a received optical signal can be effectively improved.

16 Claims, 4 Drawing Sheets

(51) Int. Cl.
*H04B 10/116* (2013.01)
*H04B 10/60* (2013.01)

(56) References Cited

U.S. PATENT DOCUMENTS

| | | | | |
|---|---|---|---|---|
| 6,963,696 | B1* | 11/2005 | Bowler | H04B 10/66 398/202 |
| 8,897,396 | B2* | 11/2014 | Itohara | H04B 1/71637 375/317 |
| 2002/0159511 | A1* | 10/2002 | Wilson | H04L 27/02 375/222 |
| 2003/0202805 | A1* | 10/2003 | Taga | H04B 10/695 398/202 |
| 2006/0081779 | A1* | 4/2006 | Yeo | H04B 10/58 250/338.1 |
| 2010/0014866 | A1* | 1/2010 | Kang | H03G 3/3084 398/99 |
| 2011/0164874 | A1* | 7/2011 | Zhang | H04B 10/695 398/38 |
| 2011/0226935 | A1* | 9/2011 | Kawahito | H01L 27/14603 250/208.1 |
| 2012/0241285 | A1* | 9/2012 | Lorello | G01J 1/18 198/341.01 |
| 2013/0057998 | A1* | 3/2013 | Li | H01H 9/56 361/187 |
| 2014/0153083 | A1 | 6/2014 | Hakimi et al. | |
| 2015/0115901 | A1* | 4/2015 | Zhang | H02M 1/32 320/166 |
| 2015/0372761 | A1* | 12/2015 | Boutaud | H04B 10/516 398/140 |
| 2017/0188420 | A1* | 6/2017 | Kido | H04B 10/116 |

FOREIGN PATENT DOCUMENTS

| | | |
|---|---|---|
| CN | 201503272 U | 6/2010 |
| CN | 102823140 A | 12/2012 |
| CN | 103812557 A | 5/2014 |
| CN | 104367309 A | 2/2015 |
| CN | 104717015 A | 6/2015 |
| CN | 104980217 A | 10/2015 |
| CN | 105094303 A | 11/2015 |
| CN | 105227245 A | 1/2016 |
| CN | 205407826 U | 7/2016 |
| KR | 101503519 B1 | 3/2015 |

* cited by examiner

OPTICAL NOISE REMOVAL CIRCUIT, OPTICAL RECEIVER, AND OPTICAL CHIP

CROSS REFERENCE TO RELATED APPLICATIONS

This application is a continuation of PCT/CN2017/075622 filed on Mar. 3, 2017, which claims priority to Chinese patent application No. 201610131707.5 filed Mar. 8, 2016 and Chinese patent application No. 201610130395.6 filed Mar. 8, 2016, all of which are incorporated herein by reference.

TECHNICAL FIELD

The present invention relates to visible light communications technologies, and in particular, to an optical noise removal circuit, an optical receiver, and an optical chip.

BACKGROUND

A visible light communications technology is a new wireless optical communications technology developed based on an LED technology. Communication is performed through high-frequency blinking of an LED light source, and a transmission rate of visible light communication reaches up to 1 gigabit per second. There are quite abundant spectrum resources in the visible light communication. No general wireless communication, including microwave communication, can compare with this. In addition, the visible light communication may be applicable to any communications protocols and any environments, and a visible light communications device features flexible and convenient deployment and low costs, and is suitable for large-scale widespread application.

Visible light is used for short-distance communication in a visible light communications system. The visible light has high directivity and cannot penetrate an obstacle, and therefore is more secure compared with a wireless communication mode. Currently, some visible light communications systems have been put into application, such as a photonic access control system and photonic payment in the photonic Internet of Things. With increasing popularization of portable devices such as a mobile phone, the mobile phone may be used as a photonic client by using a flash function of the mobile phone. This greatly lowers an application threshold of the visible light communication. In addition, the mobile phone is originally carried around by a user, and therefore no additional burden is caused to the user.

However, daily visible light communication performed by a portable photonic client such as a mobile phone is generally in an environment with ambient light. When receiving an optical signal transmitted by the photonic client, a photonic receive end converts the optical signal into a meaningful electrical signal through photoelectric conversion. However, under exposure to the ambient light, the photonic receive end still converts the meaningless ambient light into useless electrical signals. These useless electrical signals are noise signals, and prevent a photonic receiver from correctly receiving an optical signal transmitted by the photonic client.

Therefore, a technology for improving optical signal reception is urgently needed in the art.

SUMMARY

According to an aspect of the present invention, an optical noise removal circuit is provided, including: a noise filter unit, where an input end of the noise filter unit receives an electrical signal coming from an photoelectric conversion unit, and the noise filter unit is configured to filter out a noise electrical signal, in the electrical signal, that is generated due to ambient light, and output a target pulse signal at an output end; and a comparison unit, where a first input end of the comparison unit is coupled to the output end of the noise filter unit to receive the target pulse signal, and the comparison unit is configured to output a digital signal based on comparison between the target pulse signal and a reference voltage.

According to another aspect of the present invention, an optical receiver is provided, including: an photoelectric conversion unit, where the photoelectric conversion unit is configured to receive an optical signal and generate an electrical signal through photoelectric conversion; a noise filter unit, where the noise filter unit is coupled to the photoelectric conversion unit, and the noise filter unit is configured to filter out a noise electrical signal, in the electrical signal, that is generated due to ambient light, and output a target pulse signal at an output end; and a comparison unit, where a first input end of the comparison unit is coupled to the output end of the noise filter unit to receive the target pulse signal, and the comparison unit is configured to output a digital signal based on comparison between the target pulse signal and a reference voltage.

According to a third aspect of the present invention, an optical chip is provided, including: an photoelectric conversion unit, where the photoelectric conversion unit is configured to receive an optical signal and generate an electrical signal through photoelectric conversion; an optical noise removal unit, where the optical noise removal unit is coupled to the photoelectric conversion unit, and is configured to remove optical noise from the electrical signal, to output a digital level signal; and a decoding unit, where the decoding unit is configured to output an information bit based on a level flipping status of the digital level signal, to obtain transmission data.

By implementing the present invention, quality of a received optical signal can be effectively improved.

BRIEF DESCRIPTION OF DRAWINGS

After detailed descriptions of the embodiments of this disclosure are read with reference to the following drawings, the foregoing features and advantages of the present invention can be better understood. In the drawings, components are not necessarily drawn proportionally, and components having similar related characteristics or features may be represented by a same or similar sign in the drawings.

DESCRIPTION OF EMBODIMENTS

The following describes the present invention in detail with reference to drawings and specific embodiments. Note that the following aspects described with reference to the drawings and the specific embodiments are merely examples, and should not be understood as any limitation on the protection scope of the present invention.

Figure 1:
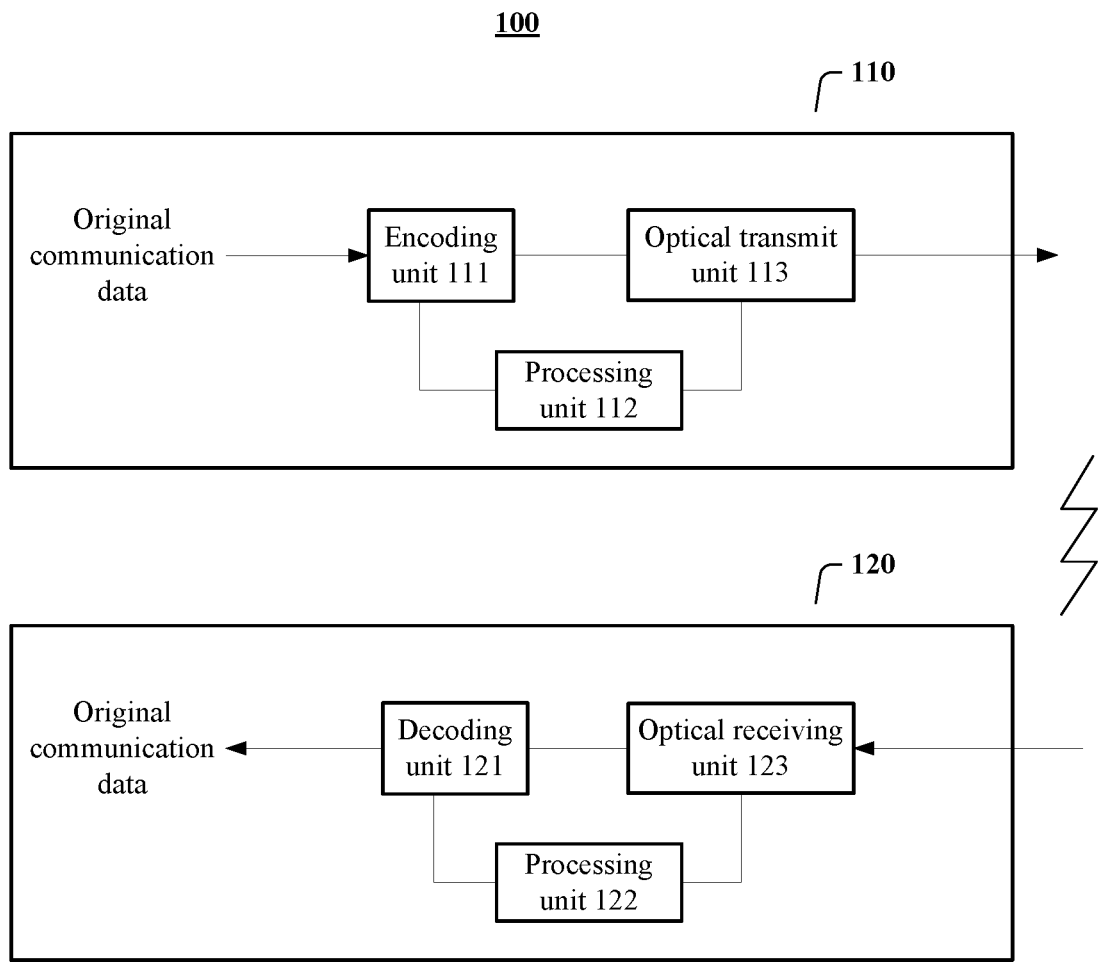
FIG. 1 is a simplified block diagram of a visible light communications system in which the present invention can be implemented.

FIG. 1 is a simplified block diagram of a visible light communications system in which the present invention can be implemented. The visible light communications system 100 includes a photonic client 110 and a photonic receive end 120. The photonic client 110 includes an encoding unit 111. The encoding unit 111 receives original communication data. The original communication data may be any information data that the photonic client 110 needs to transfer to the photonic receive end, for example, user identity (ID) information and an operation instruction.

The encoding unit 111 may encode the original communication data by using any encoding scheme. The encoding unit 111 outputs an encoded signal to an optical transmit unit 113. The optical transmit unit 113 may send the received encoded signal in a form of visible light, for example, represent logic high by emitting light and represent logic low by not emitting light (or vice versa). The optical transmit unit 113 may be an LED or another element having a light emitting function. The photonic client 110 may be a portable device, such as a mobile phone, a tablet computer, a PDA, or an optical key, in the photonic Internet of Things such as a photonic access control system. The optical key is a key, based on visible light communication, that can open a lock, and may also be referred to as a photonic key. In this case, the optical transmit unit 113 may be a flash on a mobile phone or an element that is connected to a mobile phone and that has a light emitting function.

A processing unit 112 may control operations of the encoding unit 111 and the optical transmit unit 113. The processing unit 112 may be a general-purpose processor, a digital signal processor (DSP), or the like. The general-purpose processor may be a microprocessor. However, in an alternative solution, the processing unit 112 may alternatively be any conventional processor, controller, microcontroller, or state machine. The processing unit 112 may alternatively be implemented as a combination of computing devices, for example, a combination of a DSP and a microprocessor, a plurality of microprocessors, one or more microprocessors collaborating with a DSP core, or any other configuration of this type.

The photonic receive end 120 includes an optical receiving unit 123 that is configured to receive a visible light signal transmitted by the client 110 and convert the visible light signal into a digital signal. For example, for high-frequency blinking generated by an LED light, if there is light, it indicates logic high, or if there is no light, it indicates logic low; or vice versa. Therefore, the received visible light signal can be converted into an electrical signal. The optical receiving unit 123 may include a light sensitive device, such as a phototriode or a photodiode. By using features of an electrical signal and an optical signal of the phototriode or the photodiode, an electrical pulse signal is formed through photoelectric conversion.

A decoding unit 121 receives and decodes the electrical signal output by the optical receiving unit 123, to restore the original communication data. A processing unit 122 may control operations of the decoding unit 121 and the optical receiving unit 123. The processing unit 122 may be a general-purpose processor, a digital signal processor (DSP), or the like. The general-purpose processor may be a microprocessor. However, in an alternative solution, the processing unit 122 may alternatively be any conventional processor, controller, microcontroller, or state machine. The processing unit 122 may alternatively be implemented as a combination of computing devices, for example, a combination of a DSP and a microprocessor, a plurality of microprocessors, one or more microprocessors collaborating with a DSP core, or any other configuration of this type.

The photonic receive end 120, especially the decoding unit 121 and the optical receiving unit 123 in the photonic receive end 120, may be integrated in an optical chip. The optical chip may be applied to an access control end in a photonic access control system, a photonic lock controlled end in a photonic lock system, and the like.

Figure 2:
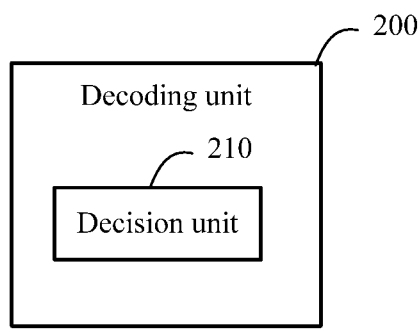
FIG. 2 is a simplified block diagram of a decoding unit according to an aspect of the present invention.

FIG. 2 is a simplified block diagram of a decoding unit 200 according to an aspect of the present invention. According to an aspect of the present invention, the decoding unit 200 may output an information bit based on a level flipping status of a digital level signal, to obtain transmission data.

Specifically, according to this aspect of the present invention, that a signal level flips once indicates a bit 1, and that a signal level remains unchanged indicates a bit 0. In other words, a transition of a signal from a high level to a low level indicates a bit 1, or a transition of a signal from a low level to a high level indicates a bit 1, but a high level is not used to represent a bit 1. Therefore, each time a bit 1 is transmitted, a level transition occurs. If five bits 1 are transmitted in a group of signals, five level transitions occur. Each level transition enables a receiver to perform resynchronization adjustment on a clock of the receiver based on actual arrival of a signal. This synchronization mechanism between a transmitter and the receiver can obviously improve signal transmission efficiency.

As shown in FIG. 2, the decoding unit 200 may include a decision unit 210. The decision unit 210 may output an information bit 1 in response to level flipping and output an information bit 0 in response to level holding. Alternatively, the decision unit 210 may output an information bit 0 in response to level flipping and output an information bit 1 in response to level holding. The decision unit 210 may be implemented by hardware formed by logic devices, such as a decision device or a decision circuit, or may be implemented by software.

Figure 3:
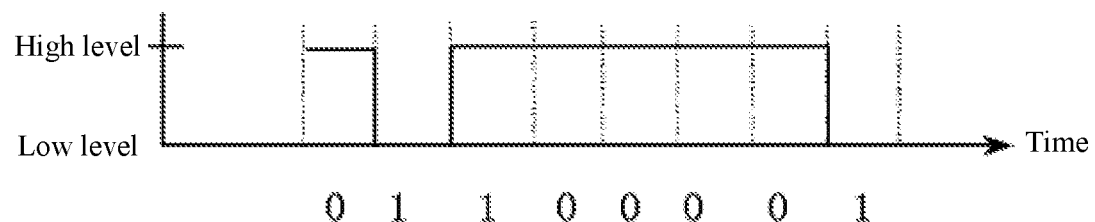
FIG. 3 is a schematic diagram of a decoding result of a decoding unit according to an aspect of the present invention.

FIG. 3 is a schematic diagram of a decoding result of a decoding unit according to the present invention. As can be learned from FIG. 3, assuming that a transition of a signal between a high level and a low level indicates a bit 1, a signal sent in the figure is 01100001.

After further research, it is found that in a process of using an optical chip, presence of ambient light causes great degradation of a capability of correctly receiving and decoding an optical signal by the optical chip. Therefore, another aspect of the present invention aims to provide an optical chip that can reduce impact of noise of ambient light.

Figure 4:
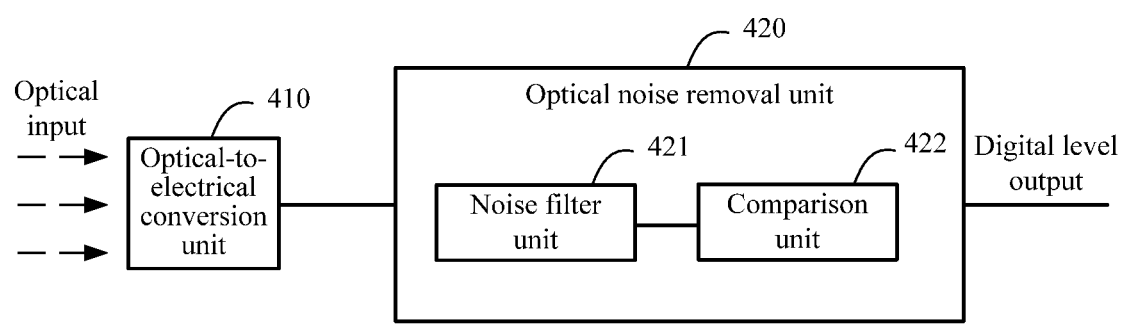
FIG. 4 is a block diagram of an optical receiving unit according to another aspect of the present invention.

FIG. 4 is a block diagram of an optical receiving unit 400 according to an aspect of the present invention. As shown in FIG. 4, the optical receiving unit 400 may include an photoelectric conversion unit 410. The photoelectric conversion unit 410 may be configured to receive an optical signal and convert the received optical signal into an electrical signal through photoelectric conversion. The photoelectric conversion unit 410 may include a phototriode, a photodiode, or the like.

The optical signal received by the photoelectric conversion unit 410 may include a target optical signal that is transmitted by a signal light source (for example, an optical transmit unit of a photonic client) and that carries communication data, but may alternatively include ambient light acting as noise. Therefore, the electrical signal generated by the photoelectric conversion unit 410 may include a target electrical signal sourcing from the signal light source, and may also include a noise electrical signal sourcing from the ambient light.

The ambient light severely affects correct reception of the target optical signal, reduces an optical communication throughput, and may even cause a communication failure. Therefore, according to an aspect of the present invention, the optical receiving unit 400 may further include an optical noise removal unit 420 to remove impact of noise of the ambient light.

The electrical signal generated by the photoelectric conversion unit 410 may include the target electrical signal sourcing from the signal light source, and may also include the noise electrical signal sourcing from the ambient light. As described above, the signal light source transmits the optical signal that regularly blinks at a high frequency. For example, if there is light, it indicates logic high, or if there is no light, it indicates logic low. Through photoelectric conversion, the corresponding target electrical signal obtained by the photoelectric conversion unit 410 is correspondingly a high/low level pulse sequence. For example, a high level is corresponding to that the signal light source emits light, and a low level is corresponding to that the signal light source emits no light. However, the ambient light is generally unchanged, or a change may be ignored. Therefore, corresponding to the ambient light, the noise electrical signal generated by the photoelectric conversion unit 410 may approximate to a direct current signal, or an alternating current signal with a relatively small amplitude and a slow change. Therefore, under a condition with ambient light, the electrical signal generated by the photoelectric conversion unit 410 after it receives the target optical signal of the signal light source is a pulse signal to which the noise electrical signal is added.

In view of this, the optical noise removal unit 420 may include a noise filter unit 421. The noise filter unit 421 is coupled to the photoelectric conversion unit 410 to receive the electrical signal generated by the photoelectric conversion unit 410. The noise filter unit 421 may filter out the noise electrical signal, in the electrical signal, that is generated due to the ambient light, to generate a target pulse signal. A pulse sequence of the target pulse signal may approximate to the target electrical signal, for example, the target pulse signal has a pulse sequence whose change is consistent with that of the target electrical signal.

The optical noise removal unit 420 may further include a comparison unit 422. A first input end of the comparison unit 422 may be coupled to an output end of the noise filter unit 421 to receive the target pulse signal. The comparison unit 422 may output a digital level signal based on comparison between the target pulse signal and a reference voltage.

Although the target pulse signal output by the noise filter unit 421 has the pulse sequence whose change is consistent with that of the target electrical signal, a pulse amplitude of the target pulse signal is usually relatively small, and the target pulse signal can be hardly used as a logic level signal of a digital circuit. The comparison unit 422 may output a logic level signal based on the comparison between the target pulse signal and the reference voltage. For example, depending on a supply voltage, a high level may reach 3 V to 5 V. A value of the reference voltage may be between a peak value and a trough value of the pulse sequence of the target pulse signal. For example, when a level of the target pulse signal is higher than the reference voltage (corresponding to a pulse of the target pulse signal), the comparison unit 422 may output a logic high level; or when a level of the target pulse signal is lower than the reference voltage (corresponding to a pulse interval of the target pulse signal), the comparison unit 422 may output a logic low level. In this way, a logic level signal accurately reflecting digital logic of the target optical signal transmitted by the signal light source may be obtained.

In this case, a decoding object of a decoding unit is the digital level signal output by the comparison unit 422. Because the digital level signal is a clean signal from which optical noise is removed, decoding efficiency of the decoding unit can be improved, and the optical communication throughput can be further improved.

In this embodiment, the optical noise removal unit may alternatively be implemented by a circuit component in a form of a circuit, that is, implemented as an optical noise removal circuit. In this case, the optical noise removal circuit includes: a noise filter unit, where an input end of the noise filter unit receives an electrical signal coming from an photoelectric conversion unit, and the noise filter unit is configured to filter out a noise electrical signal, in the electrical signal, that is generated due to ambient light, and output a target pulse signal at an output end; and a comparison unit, where a first input end of the comparison unit is coupled to the output end of the noise filter unit to receive the target pulse signal, and the comparison unit is configured to output a digital signal based on comparison between the target pulse signal and a reference voltage.

Figure 5:
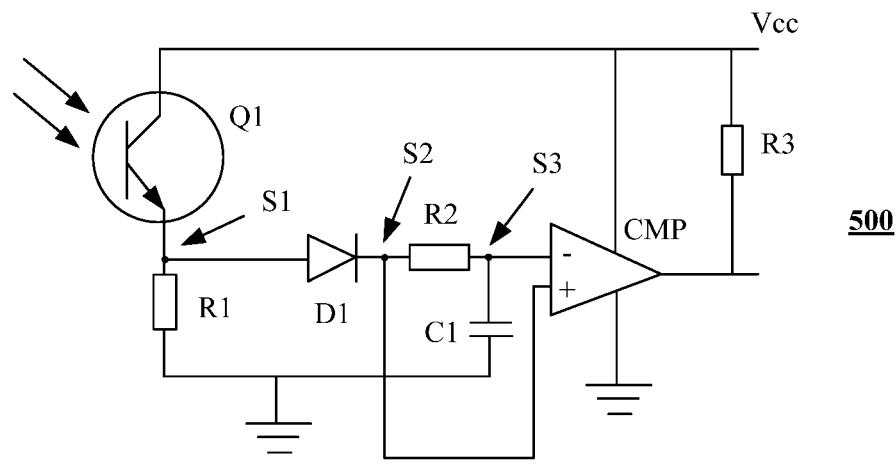
FIG. 5 is a block diagram of components of an optical receiver according to a first embodiment of the present invention.

FIG. 5 is a block diagram of components of an optical receiving unit 500 according to a first embodiment of the present invention. As shown in FIG. 5, the optical receiving unit 500 may include a phototriode Q1, to convert an optical signal into an electrical signal. Alternatively, another light sensitive device such as a photodiode may be used as an photoelectric conversion unit.

The optical receiving unit 500 may further include a diode D1 and a resistor R1. A collector of the phototriode Q1 is coupled to a supply voltage Vcc (for example, 5 V), an emitter of the phototriode Q1 is coupled to one end of the resistor R1 and a positive electrode of the diode D1, and the other end of the resistor R1 is grounded. Herein, the resistor R1 performs a function of clamping, in other words, the resistor R1 is a clamping resistor.

The optical receiving unit 500 may further include a resistor R2, a capacitor C1, and an operation comparator CMP. One end of the resistor R2 is coupled to a negative electrode of the diode D1, the other end is coupled to one end of the capacitor C1 and a negative input terminal of the comparator CMP, and the other end of the capacitor C1 is grounded. In addition, a positive input terminal of the comparator CMP is coupled to the negative electrode of the diode D1. An output end of the comparator CMP may output a digital level signal Vout, and is coupled to the supply voltage Vcc by using a resistor R3.

When the phototriode Q1 is not exposed to any light (including a signal light source and ambient light), the phototriode Q1 is in a cut-off state, no current passes the phototriode Q1, and a voltage at a node S1 is 0. Correspondingly, the diode D1 is also in a cut-off state.

When the phototriode Q1 is exposed to light (for example, a signal light source, an ambient light source, or both of them), because of a photoelectric effect, a current passing the phototriode Q1 is generated, and consequently, voltage fluctuation occurs at the node S1. The voltage fluctuation at the node S1 represents a corresponding electrical signal generated through photoelectric conversion.

Figure 6:
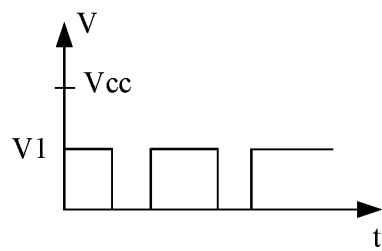
FIG. 6 is a schematic diagram of a target electrical signal generated by an photoelectric conversion unit under a condition without ambient light.

A target optical signal of a signal light source blinks at a high frequency. In an ideal case, that is, under a condition without ambient light, the electrical signal generated at S1 is a target electrical signal corresponding to the target optical signal. The target electrical signal is a high/low level pulse sequence. FIG. 6 is a schematic diagram of the target electrical signal generated by the photoelectric conversion unit under the condition without ambient light. An amplitude of a pulse of the target electrical signal is V1.

Figure 7:
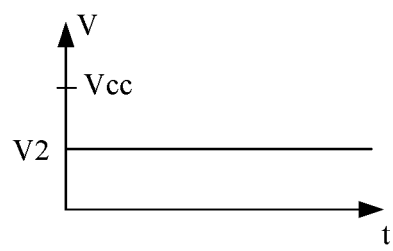
FIG. 7 is a schematic diagram of a noise electrical signal generated by an photoelectric conversion unit under a condition with ambient light and with no signal light source.

When there is ambient light but no signal light source, due to exposure to the ambient light, the electrical signal generated at the node S1 is a noise electrical signal corresponding to the ambient light. FIG. 7 is a schematic diagram of the noise electrical signal generated by the photoelectric conversion unit under the condition with ambient light and with no signal light source. Generally, ambient light may be considered as unchanged or changing relatively slowly. Therefore, a corresponding noise electrical signal may approximate to a direct current signal whose value is V2, as shown in FIG. 7.

Figure 8:
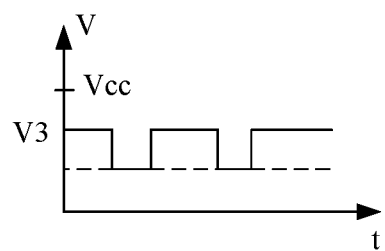
FIG. 8 is a schematic diagram of an electrical signal generated by an photoelectric conversion unit under a condition with ambient light and with a signal light source.

When there are both a signal light source and ambient light, an electrical signal including both a target electrical signal and a noise electrical signal may be generated at the node S1. FIG. 8 is a schematic diagram of the electrical signal generated by the photoelectric conversion unit under the condition with ambient light and with a signal light source. As shown in FIG. 8, in this case, the electrical signal is a pulse signal obtained after a direct current noise electrical signal is added based on a target electrical signal. An amplitude of a pulse is V3=V1+V2, and a level at a pulse interval is V2.

A voltage at the node S1 depends on the current (depending on light intensity) passing the resistor R1 and resulting from the photoelectric conversion, and a resistance value of R1. Higher light intensity indicates a larger resistance value of the resistor R1 and a larger voltage at the node S1. Generally, light intensity of ambient light is less than light intensity of a signal light source (for example, a flash). Therefore, regarding relative values, V1>V2.

It is assumed that a conduction voltage of the diode D1 is $V_T$. By selecting a proper resistance value of R1, $V1 > V_T \geq V2$ may be achieved. That is, under a condition with only ambient light, a direct current noise electrical signal is insufficient to switch on the diode D1. D1 remains in a cut-off state, and a voltage at a node S2 remains at 0. However, under a condition with only a signal light source or with both a signal light source and ambient light, a generated electrical signal (including a target electrical signal and a noise electrical signal) may make the diode D1 be regularly switched on and cut off based on a pulse sequence of the target electrical signal, so as to generate a target pulse signal corresponding to the target electrical signal at the node S2. The target pulse signal has a pulse sequence whose change is consistent with that of the target electrical signal, and a pulse amplitude is as follows:

$V4=V1-V_T$, under the condition with only a signal light source but without ambient light; and $V4=V3-V_T=V1+V2-V_T$, under the condition with both a signal light source and exposure to ambient light.

Figure 9:
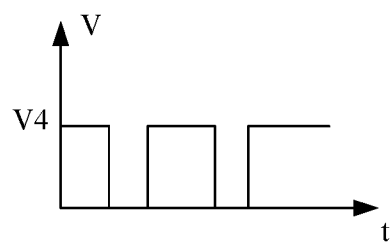
FIG. 9 is a schematic diagram of a target pulse signal output by an optical noise filter unit.

FIG. 9 is a schematic diagram of the target pulse signal. As shown in FIG. 9, the target pulse signal has a pulse sequence whose change is consistent with that of the target electrical signal, and an only difference lies in a pulse amplitude: $V4 \leq V1$.

Herein, the diode D1 performs a function of filtering out optical noise, and may be corresponding to the noise filter unit 421 in FIG. 4. In some cases, ambient light, such as a fluorescent light, also changes at a specific frequency. However, the change may be ignored compared with blinking frequency of a signal light source. Therefore, a noise electrical signal approximates to a direct current signal in this specification. However, in this case, a generated noise electrical signal may still affect final logic output. Therefore, reception precision is greatly improved when the diode D1 is used to filter out the noise electrical signal.

The negative electrode of the diode D1 is coupled to the positive input terminal of the comparator CMP, that is, sends the target pulse signal to the comparator CMP as positive input of the comparator CMP. The comparator CMP has two input terminals: the positive input terminal and the negative input terminal. When the positive input of the comparator CMP is greater than negative input, logic high is output, for example, a TTL level 3 V. This depends on a supply voltage Vcc. Otherwise, logic low is output, for example, a TTL level 0 V.

The negative input terminal of the comparator CMP is coupled to a connection point S3 of the resistor R2 and the capacitor C1. Herein, the resistor R2 and C1 may form a low-pass filter, to filter the target pulse signal. Any signal f(t) may be expanded by using Fourier series:

$$f(t) = A_0 + \sum_{n=1}^{\infty} a_n \cos n\omega t + b_n \sin n\omega t$$

Therefore, after the target pulse signal passes the low-pass filter, in an ideal case, only a direct current component passes the low-pass filter. A transfer function of an RC filter is $$H(j\omega) = \frac{1}{1+j\omega R_2 C_1}, \text{ where } |H(j\omega)| = \frac{1}{\sqrt{1+(\omega/\omega_c)}},$$

ω is an input signal frequency, and $$\omega_c = \frac{1}{R_2 C_1}.$$

Figure 10:
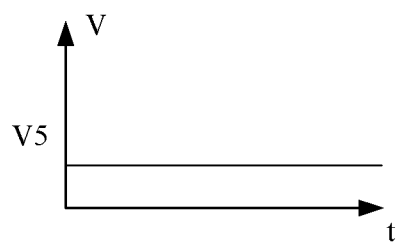
FIG. 10 is a schematic diagram of a signal obtained after a target pulse signal is filtered.

When ω=0, |H(jω)|=1. When ω≠0, a gain is 0<|H(jω)|<1. In an actual circuit, the RC low-pass filter does not filter out all frequency components other than the direct current component. Therefore, after the target pulse signal passes the low-pass filter, an approximate direct current component in the target pulse signal is output at the node S3. An amplitude of the component is between 0 and V4, specifically depending on values of R2 and C1. FIG. 10 is a schematic diagram of a signal, namely, V5, obtained after the target pulse signal is filtered.

Figure 11:
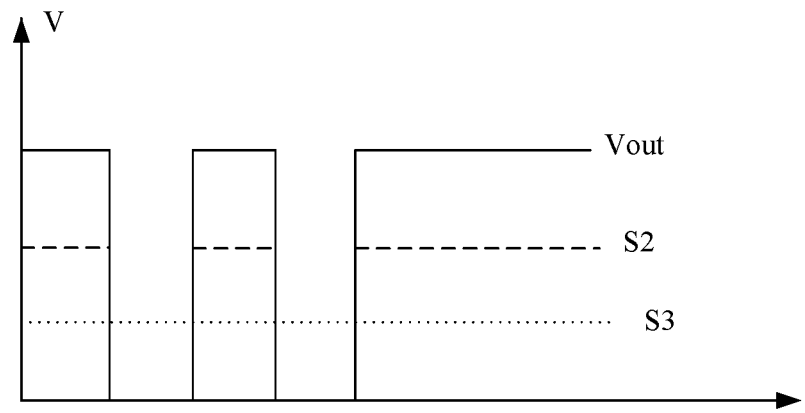
FIG. 11 is a schematic diagram of a digital level signal output by a comparator.

The signal obtained after filtering at the node S3 is input to the negative input terminal of the comparator CMP. The comparator CMP may output a digital level signal. The digital level signal is a logic level signal. For example, logic 1 is at a TTL high level (for example, 3 V), and logic 0 is at a TTL low level (for example, 0 V). FIG. 11 is a schematic diagram of the digital level signal output by the comparator.

The comparator CMP herein may be corresponding to the comparison unit 422 in FIG. 4. The low-pass filter formed by R2 and C1 provides a reference voltage for the comparator CMP for comparison, and therefore is considered as a reference voltage generation unit.

Figure 12:
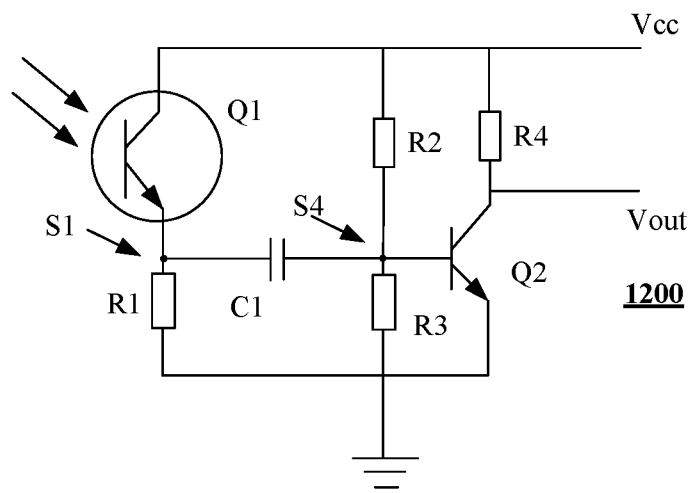
FIG. 12 is a block diagram of components of an optical receiver according to a second embodiment of the present invention.

FIG. 12 is a block diagram of components of an optical receiving unit 1200 according to a second embodiment of the present invention. Similar to FIG. 5, the optical receiving unit 1200 may include a phototriode Q1, to convert an optical signal into an electrical signal. Alternatively, another light sensitive device such as a photodiode may be used as an photoelectric conversion unit.

The optical receiving unit 1200 may further include a capacitor C1 and a resistor R1. A collector of the phototriode Q1 is coupled to a supply voltage Vcc (for example, 5 V), an emitter of the phototriode Q1 is coupled to one end of the resistor R1 and one end of the capacitor C1, and the other end of the resistor R1 is grounded.

The optical receiving unit 1200 may further include a divider resistor and a triode Q2. The other end of the capacitor C1 is coupled to an intermediate node of the divider resistor. The divider resistor includes a resistor R2 and a resistor R3. The intermediate node of R2 and R3 is further coupled to a base of the triode Q2. The other end of R2 is coupled to the supply voltage Vcc, and the other end of R3 is grounded. An emitter of the triode Q2 is grounded. A collector of the triode Q2 is coupled to the supply voltage by using a resistor R4, and the collector is further configured to output a digital level signal Vout.

Similar to the foregoing descriptions with reference to FIG. 5, when the phototriode Q1 is not exposed to any light (including a signal light source and ambient light), the phototriode Q1 is in a cut-off state, no current passes the phototriode Q1, and a voltage at a node S1 is 0.

When the phototriode Q1 is exposed to light (for example, a signal light source, an ambient light source, or both of them), because of a photoelectric effect, a current passing the phototriode Q1 is generated, and consequently, voltage fluctuation occurs at the node S1. The voltage fluctuation at the node S1 represents a corresponding electrical signal generated through photoelectric conversion.

Values of the divider resistors R2 and R3 determine a basic voltage at a node S4:

$$V_{Basic} = V_{cc} \cdot \frac{R_3}{R_2 + R_3}.$$

It is easily understood that when the phototriode Q1 is not exposed to any light, the basic voltage is an offset voltage of the triode Q2.

A target optical signal of a signal light source blinks at a high frequency. In an ideal case, that is, under a condition without ambient light, the electrical signal generated at S1 is a target electrical signal corresponding to the target optical signal. The target electrical signal is a high/low level pulse sequence.

When there is ambient light but no signal light source, due to exposure to the ambient light, the electrical signal generated at the node S1 is a noise electrical signal corresponding to the ambient light. Generally, ambient light may be considered as unchanged or changing relatively slowly. Therefore, a corresponding noise electrical signal may approximate to a direct current signal.

When there are both a signal light source and ambient light, an electrical signal including both a target electrical signal and a noise electrical signal may be generated at the node S1. In this case, the electrical signal is a pulse signal obtained after a direct current noise electrical signal is added based on a target electrical signal.

The capacitor C1 performs functions of letting an alternating current pass and isolating a direct current. That is, a direct current component in the electrical signal cannot arrive at a node S4. As described above, the noise electrical signal is a direct current signal or an approximate direct current signal. Therefore, the capacitor C1 can effectively filter out the noise electrical signal. Therefore, C1 performs a function of filtering out the noise electrical signal, and is corresponding to the noise filter unit 421 in FIG. 4. A target pulse signal arriving at the node S4 may approximate to the target electrical signal, for example, has a pulse sequence whose change is consistent with that of the target electrical signal.

By disposing the divider resistor, the basic voltage $V_{Basic}$ may be set to be less than a conduction voltage of Q2, and greater than the conduction voltage of Q2 after a voltage of the target pulse signal is added. Therefore, the triode Q2 may be regularly switched on and cut off based on the pulse sequence of the target electrical signal. When the triode Q2 is switched on or cut off, a corresponding digital level signal Vout may be output at the collector.

In this embodiment, the triode Q2 outputs the digital level signal through comparison between a voltage at the node S4 and the conduction voltage of the triode Q2, and may be corresponding to the comparison unit 422 in FIG. 4. Because the reference voltage is the conduction voltage of the triode Q2, the comparison unit 422 may be considered to include a reference voltage generation unit, or the reference voltage generation unit is a part of the comparison unit.

Figure 13:
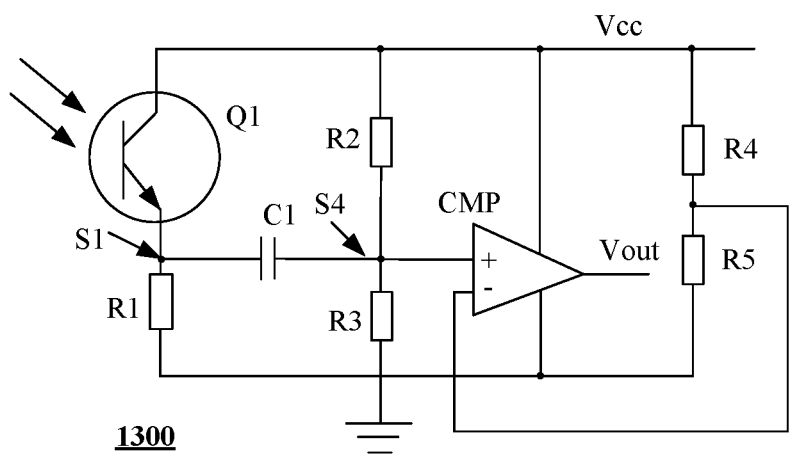
FIG. 13 is a block diagram of components of an optical receiver according to a third embodiment of the present invention.

FIG. 13 is a block diagram of components of an optical receiving unit 1300 according to a third embodiment of the present invention. Similar to FIG. 12, the optical receiving unit 1300 may include a phototriode Q1, to convert an optical signal into an electrical signal. Alternatively, another light sensitive device such as a photodiode may be used as an photoelectric conversion unit.

The optical receiving unit 1300 may further include a capacitor C1 and a resistor R1. A collector of the phototriode Q1 is coupled to a supply voltage Vcc (for example, 5 V), an emitter of the phototriode Q1 is coupled to one end of the resistor R1 and one end of the capacitor C1, and the other end of the resistor R1 is grounded.

The optical receiving unit 1300 may further include a first divider resistor and a comparator CMP. The other end of the capacitor C1 is coupled to an intermediate node of the divider resistor. The first divider resistor includes a resistor R2 and a resistor R3. The intermediate node between R2 and R3 is further coupled to a positive input terminal of the comparator CMP. The other end of R2 is coupled to the supply voltage Vcc, and the other end of R3 is grounded.

The optical receiving unit 1300 may further include a second divider resistor. The second divider resistor includes a resistor R4 and a resistor R5. A negative input terminal of the comparator CMP may be coupled to an intermediate node of the second divider resistor. The other end of R4 is coupled to the supply voltage Vcc, and the other end of R5 is grounded.

A circuit in FIG. 13 and that in FIG. 12 are the same from the left side to the node S4. That is, a target pulse signal may be generated at the node S4. A difference lies in that the comparator CMP is used in FIG. 13 as a comparison unit to perform comparison and output. That is, the target pulse signal is input to the positive input terminal of the comparator CMP. The negative input terminal of the comparator CMP is coupled to the intermediate node of the second divider resistor, namely, a connection point of R4 and R5, to receive a reference voltage used for comparison. In this sense, the second divider resistor may be considered as a reference voltage generation unit.

It is easily understood that the reference voltage input to the negative input terminal of the comparator CMP may be between a peak voltage and a trough value of a pulse sequence of the target pulse signal. In this way, the CMP may output a logic level signal reflecting digital logic of a target optical signal transmitted by a signal light source.

Although particular embodiments are described for the purpose of description, it is easily understood that the aspects of the present invention are not limited to these particular embodiments. Some components described with reference to the particular embodiments may be not mandatory, there may be alternative components, or there may be additional components. For example, the comparator in the first embodiment described with reference to FIG. 5 may be implemented by using a triode or another comparison means.

A person skilled in the art may understand that the illustrative logical blocks, modules, circuits, and algorithms described with reference to the embodiments disclosed herein may be implemented as electronic hardware, an instruction stored in a memory or another computer-readable medium and executed by a processor or another processor device, or a combination thereof. The memory disclosed herein may be a memory of any type and size, and may be configured to store any type of information required. To clearly describe the interchangeability, the foregoing generally describes the illustrative components, blocks, modules, circuits, and steps in a form of functions. How such functions are implemented depends on specific applications, design choices, and/or design constraints imposed on an entire system. A skilled person may implement the described functions in different manners for each specific application. However, such implementation decision should not be understood as beyond the scope of this disclosure.

The illustrative logical blocks, modules, and circuits described with reference to the embodiments disclosed in this specification may be implemented or executed by using a processor, a DSP, an application-specific integrated circuit (ASIC), an FPGA or another programmable logic device, a discrete gate or transistor logic, a discrete hardware component, or any combination thereof that is designed to execute the functions described in this specification. The processor may be a microprocessor. However, in an alternative solution, the processor may be any conventional processor, controller, microcontroller, or state machine. The processor may alternatively be implemented as a combination of computing devices, for example, a combination of a DSP and a microprocessor, a plurality of microprocessors, one or more microprocessors collaborating with a DSP core, or any other configuration of this type.

The embodiments disclosed herein may be implemented as hardware and instructions stored in hardware. For example, these instructions may reside in a random access memory (RAM), a flash memory, a read-only memory (ROM), an electrical programmable ROM (EPROM), an electrically erasable programmable ROM (EEPROM), a register, a hard disk, a removable disk, a CD-ROM, or any other form of storage medium known in the art. For example, the storage medium is coupled with the processor, so that the processor can read and write information from/to the storage medium. Alternatively, the storage medium may be integrated into the processor. The processor and the storage medium may reside in an ASIC.

The foregoing descriptions provided for this disclosure are to make any person skilled in the art be able to fabricate or use this disclosure. Various modifications to this disclosure are obvious to a person skilled in the art, and universal principles defined in this specification can be applied to other variations without departing from the spirit or scope of this disclosure. Therefore, this disclosure is not intended to be limited to the examples and designs described in this specification, but should be granted a widest scope consistent with the principles and novel features disclosed in this specification.

What is claimed is:

1. An optical noise removal circuit, comprising:
   a noise filter unit, wherein an input end of the noise filter unit receives an electrical signal coming from an photoelectric conversion unit, and the noise filter unit is configured to filter out a noise electrical signal, in the electrical signal, that is generated due to ambient light, and output a target pulse signal at an output end; and
   a comparison unit, wherein a first input end of the comparison unit is coupled to the output end of the noise filter unit to receive the target pulse signal, and the comparison unit is configured to output a digital signal based on comparison between the target pulse signal and a reference voltage;
   wherein the noise filter unit comprises: a diode, wherein a positive electrode of the diode is coupled to the photoelectric conversion unit, and a negative electrode of the diode is coupled to the first input end of the comparison unit;
   wherein the optical noise removal circuit further comprises: a clamping resistor, wherein the clamping resistor is connected to the photoelectric conversion unit in series, a first end of the clamping resistor is coupled to one end of the photoelectric conversion unit and the positive electrode of the diode, a second end of the clamping resistor is grounded, the other end of the photoelectric conversion unit is connected to a supply voltage, the clamping resistor clamps a voltage on the positive electrode of the diode to a voltage level that is less than a conduction voltage of the diode when there is no exposure to a signal light source and that is greater than the conduction voltage of the diode when there is exposure to a signal light source.

2. The optical noise removal circuit according to claim 1, further comprising:

a reference voltage generation unit, wherein the reference voltage generation unit comprises a resistor and a capacitor to form a low-pass filter, one end of the resistor is coupled to the negative electrode of the diode, the other end is coupled to one end of the capacitor and a second input end of the comparison unit to provide the reference voltage, and the other end of the capacitor is grounded.

3. The optical noise removal circuit according to claim 1, wherein the noise filter unit comprises:
a coupling capacitor, wherein a first end of the coupling capacitor is coupled to the photoelectric conversion unit, and a second end is coupled to the first input end of the comparison unit.

4. The optical noise removal circuit according to claim 3, further comprising:
a first divider resistor, wherein a first node of the first divider resistor is coupled to a supply voltage, a second node is grounded, an intermediate node is coupled to the second end of the coupling capacitor and the first input end of the comparison unit, and a voltage at the intermediate node is less than the reference voltage when there is no exposure to a signal light source and is greater than the reference voltage when there is exposure to a signal light source.

5. The optical noise removal circuit according to claim 1, wherein the comparison unit comprises:
a comparator, wherein a positive input terminal of the comparator is the first input end of the comparison unit, and a negative input terminal receives the reference voltage;
wherein the optical noise removal circuit further comprises: a reference voltage generation unit, wherein the reference voltage generation unit is coupled to the negative input terminal of the comparator to provide the reference voltage;
wherein the reference voltage generation unit comprises:
a second divider resistor, wherein a first node of the second divider resistor is coupled to a supply voltage, a second node is grounded, and an intermediate node is coupled to the negative input terminal of the comparator to provide the reference voltage.

6. The optical noise removal circuit according to claim 1, wherein the comparison unit comprises:
a triode, wherein a base of the triode is the first input end of the comparison unit and is therefore coupled to the output end of the noise filter unit, an emitter of the triode is grounded, a collector is coupled to a supply voltage by using a resistor, the collector is configured to output the digital signal, and the reference voltage is a conduction voltage of the triode.

7. An optical chip, comprising:
an photoelectric conversion unit, wherein the photoelectric conversion unit is configured to receive an optical signal and generate an electrical signal through photoelectric conversion;
an optical noise removal unit, wherein the optical noise removal unit is coupled to the photoelectric conversion unit, and is configured to remove optical noise from the electrical signal, to output a digital level signal; and
a decoding unit, wherein the decoding unit is configured to output an information bit based on a level flipping status of the digital level signal, to obtain transmission data;
wherein the noise filter unit comprises: a diode, wherein a positive electrode of the diode is coupled to the photoelectric conversion unit, and a negative electrode of the diode is coupled to the first input end of the comparison unit;
wherein the optical noise removal unit further comprises:
a clamping resistor, wherein the clamping resistor is connected to the photoelectric conversion unit in series, a first end of the clamping resistor is coupled to one end of the photoelectric conversion unit and the positive electrode of the diode, a second end of the clamping resistor is grounded, the other end of the photoelectric conversion unit is connected to a supply voltage, the clamping resistor clamps a voltage on the positive electrode of the diode to a voltage level that is less than a conduction voltage of the diode when there is no exposure to a signal light source and that is greater than the conduction voltage of the diode when there is exposure to a signal light source.

8. The optical chip according to claim 7, wherein the decoding unit comprises:
a decision unit, outputting an information bit 1 in response to level flipping and outputting an information bit 0 in response to level holding; or
the decision unit outputs an information bit 0 in response to level flipping and outputs an information bit 1 in response to level holding.

9. The optical chip according to claim 8, wherein the level flipping comprises flipping from a low level to a high level and flipping from a high level to a low level.

10. The optical chip according to claim 7, wherein the optical noise removal unit comprises:
a noise filter unit, wherein an input end of the noise filter unit receives an electrical signal coming from the photoelectric conversion unit, and the noise filter unit is configured to filter out a noise electrical signal, in the electrical signal, that is generated due to ambient light, and output a target pulse signal at an output end; and
a comparison unit, wherein a first input end of the comparison unit is coupled to the output end of the noise filter unit to receive the target pulse signal, and the comparison unit is configured to output the digital level signal based on comparison between the target pulse signal and a reference voltage.

11. The optical chip according to claim 7, wherein the optical noise removal unit further comprises:
a reference voltage generation unit, wherein the reference voltage generation unit comprises a resistor and a capacitor to form a low-pass filter, one end of the resistor is coupled to the negative electrode of the diode, the other end is coupled to one end of the capacitor and a second input end of the comparison unit to provide the reference voltage, and the other end of the capacitor is grounded.

12. The optical chip according to claim 10, wherein the noise filter unit comprises:
a coupling capacitor, wherein a first end of the coupling capacitor is coupled to the photoelectric conversion unit, and a second end is coupled to the first input end of the comparison unit.

13. The optical chip according to claim 12, wherein the optical noise removal unit further comprises:
a first divider resistor, wherein a first node of the first divider resistor is coupled to a supply voltage, a second node is grounded, an intermediate node is coupled to the second end of the coupling capacitor and the first input end of the comparison unit, and a voltage at the intermediate node is less than the reference voltage when there is no exposure to a signal light source and is greater than the reference voltage when there is exposure to a signal light source.

14. The optical chip according to claim 10, wherein the comparison unit comprises:
a comparator, wherein a positive input terminal of the comparator is the first input end of the comparison unit, and a negative input terminal receives the reference voltage;
wherein the optical noise removal unit further comprises:
a reference voltage generation unit, wherein the reference voltage generation unit is coupled to the negative input terminal of the comparator to provide the reference voltage.

15. The optical chip according to claim 14, wherein the reference voltage generation unit comprises:
a second divider resistor, wherein a first node of the second divider resistor is coupled to a supply voltage, a second node is grounded, and an intermediate node is coupled to the negative input terminal of the comparator to provide the reference voltage.

16. The optical chip according to claim 10, wherein the comparison unit comprises:
a triode, wherein a base of the triode is the first input end of the comparison unit and is therefore coupled to the output end of the noise filter unit, an emitter of the triode is grounded, a collector is coupled to a supply voltage by using a resistor, the collector is configured to output the digital level signal, and the reference voltage is a conduction voltage of the triode.

* * * * *

UNITED STATES PATENT AND TRADEMARK OFFICE
CERTIFICATE OF CORRECTION

PATENT NO. : 10,567,088 B2
APPLICATION NO. : 16/122884
DATED : February 18, 2020
INVENTOR(S) : Ruopeng Liu et al.

It is certified that error appears in the above-identified patent and that said Letters Patent is hereby corrected as shown below:

On the Title Page

After item (63), please add:
-- Foreign Application Priority Data
Mar. 8, 2016 (CN) 201610131707.5
Mar. 8, 2016 (CN) 201610130395.6 --

Signed and Sealed this
Sixteenth Day of May, 2023

Katherine Kelly Vidal
*Director of the United States Patent and Trademark Office*